United States Patent [19]

Woytowich

[11] Patent Number: 5,408,960
[45] Date of Patent: Apr. 25, 1995

[54] PRE-HEATER FOR LIQUID-COOLED INTERNAL COMBUSTION ENGINES

[76] Inventor: Walter J. Woytowich, RR. 1, Chalk River, Ontario K0J 1J0, Canada

[21] Appl. No.: 238,728

[22] Filed: May 5, 1994

[51] Int. Cl.6 .......................... F02N 17/02; B60L 1/02
[52] U.S. Cl. ............................... 183/142.5 E; 219/208
[58] Field of Search .................. 123/142.5 E; 219/208

[56] References Cited

U.S. PATENT DOCUMENTS

| | | | |
|---|---|---|---|
| 1,562,240 | 11/1925 | Melotti | 123/142.5 E |
| 2,527,011 | 10/1950 | Keil | 123/142.5 |
| 2,712,815 | 7/1955 | Blessing | 123/142.5 |
| 2,721,544 | 10/1955 | Kimberlin | 123/142.5 |
| 3,626,148 | 12/1971 | Woytowich | 219/208 |
| 3,969,605 | 7/1976 | Danell | 219/208 |
| 4,245,593 | 1/1981 | Stein | 123/142.5 E |
| 4,286,551 | 9/1981 | Blitz | 123/142.5 E |
| 4,372,260 | 2/1983 | Baker | 123/142.5 E |
| 4,398,081 | 8/1983 | Moad | 123/142.5 E |
| 4,463,738 | 8/1984 | Lee et al. | 123/142.5 E |
| 4,634,834 | 1/1987 | Lopoli et al. | 123/142.5 E |
| 4,844,029 | 7/1989 | Suzuki | 123/142.5 E |

*Primary Examiner*—Henry C. Yuen
*Assistant Examiner*—Erick Solis
*Attorney, Agent, or Firm*—Adrian Zahl

[57] ABSTRACT

An engine heater is provided for installation in a liquid-cooled internal combustion engine. The heater includes an electrical resistance heater element and a pump driven by an electric motor to circulate heated fluid through the engine. A thermostatically-controlled switch in thermal contact with the housing may be provided, to shut the device off when the temperature of the device exceeds a predetermined level. The heater may comprise dual resistors housed within a helical sheath that surrounds a direct-current ("DC") pump motor housed within a watertight pump casing. The motor drives an impeller positioned externally to the motor casing. An array of anti-swirl vanes are positioned within the housing extending outwardly from the motor casing adjacent to and downstream of the impeller to guide the flow of fluid and prevent it from rotating with the impeller.

10 Claims, 4 Drawing Sheets

PRE-HEATER FOR LIQUID-COOLED INTERNAL COMBUSTION ENGINES

FIELD OF THE INVENTION

The present invention relates to an in-line type electrical heater for installation in a liquid-cooled internal combustion engine. The heater draws household current to pre-heat the engine prior to the engine's being started in cold weather.

BACKGROUND OF THE INVENTION

The usefulness of internal combustion engine pre-heaters (referred to generally herein as "engine heaters") is well established, particularly for use in vehicles. Preheating an engine prior to its being started in cold weather aids in starting the vehicle and extends the life of the engine, battery, starter and drive train components. As well, it lessens pollution, reduces fuel consumption, and hastens the delivery of heat to the windshield defroster and driver. Engine heaters, while used primarily in automobiles, may with little or no adaptation be used in other types of liquid-cooled internal combustion engines, including truck and recreational vehicle engines.

Conventional engine heaters generally rely on convection, conduction or vapour pressure to convey heat generated by a heating element to the engine. Conventional heaters generally fall into four categories: "block" (including "bolt-on block heaters"), "tank", "in-line", and "lower radiator hose". The names indicate their placement or application on the vehicle.

A block heater is fitted into the water jacket of an engine or, in the case of an aluminum block engine, may be bolted directly to the exterior of the engine block. In this latter case, much of the heat generated by the device is lost to the outside air. Block heaters consist of an electrical heating element housed within a sheath. The heat generated by the heating element is transferred to the engine largely by way of convection (in the case of water jacket placement) or conduction (in the case of external attachment). Due to the limited space available for these heaters, they are required to have a high "watt-density" ratio, which hastens their breakdown. As well, since convection moves the warmed fluid primarily in a vertical direction, considerable temperature differences within the engine may result. This may distort the engine and can confuse the thermal sensors within the engine sufficiently to prevent the engine from starting.

Installation of a block heater is difficult and expensive, and should be attempted only by a trained mechanic having the appropriate equipment. A further drawback of block heaters is their low position within the engine when typically installed in frost plug openings, which exposes the heater's electrical connections to salt, water, and other corrosive substances and can lead to a breakdown of electrical connections.

A tank heater is essentially a block heater within a housing through which engine coolant circulates by convection. The tank heater is typically installed externally to the engine, and is connected between a "T" junction in the lower radiator hose and a drain plug in the engine block. Hoses convey coolant to and from the device. Tank heaters have many of the drawbacks of block heaters, and suffer as well from their greater exposed surface area, which wastes heat. As well, since heat is transferred from the device by means of convection through the coolant hoses, heating of the engine may be unreliable.

A conventional in-line heater, represented by U.S. Pat. No. 3,626,148 (Woytowich et al.) is spliced into a hose of the passenger compartment heater circuit, and consists of a heating coil within a housing. The housing is provided with an inlet and an outlet, each having a one-way check valve conducting towards the engine water pump. The device is installed by cutting an existing hose of the engine and engaging the inlet and outlet, respectively, to the exposed hose ends. The heating coil vaporizes the engine coolant, and the hot vapour is expelled in pulses through the outlet valve, with the vapour condensing as it cools within the engine. The one-way valves are required to direct the flow of the expelled vapour. This device is typically bulky and requires the engine coolant to be a 50–50 glycol and water mix for optimal performance. As well, the device operates only at a relatively high temperature (about 250 degrees F.) in order to vaporize the fluid, and this results in reduced efficiency and heat losses from the exterior of the device. The device also requires the use of one-way valves, which impede the flow of fluid when the engine is running.

The lower radiator hose heater, as exemplified by U.S. Pat. Nos. 3,919,520 (Pickard) and 3,943,325 (Pickard), fits into the coolant hose between the radiator and the water pump. This type of heater is essentially a tank heater adapted to be installed in the radiator hose. However, since the engine thermostat blocks coolant flow between the engine and the radiator at temperatures below approximately 180 degrees F. (82 degrees C.), it is unlikely that a useful amount of heat can reach the engine with this device. As well, its proximity to the radiator will result in much of the heat generated by the device being dissipated without heating the engine.

The conventional heater designs described above generally rely on passive transmission of heat from the heater to the engine, for example by means of convection and conduction. The conventional in-line heater provides active circulation of heated fluid, but relies on heating the fluid substantially. As well, this device requires the use of one-way valves. By virtue of their reliance on a heat differential to heat an engine, conventional devices require the heater element to be relatively hot if the engine is to be heated within a reasonable time. This results in uneven heat distribution within the engine, and reduced efficiency of the heater.

The drawbacks described above may be addressed by an in-line type engine heater that actively pumps heated fluid through the engine by means of a pump driven by an electric motor. The use of a pump allows the heater to actively circulate a relatively large volume of fluid past its heater element, with the fluid being heated a relatively small amount with each cycle, thus improving efficiency and providing a more even distribution of heat throughout the engine than with conventional devices. There is no need to generate a large heat differential between the device and the engine. For example, a heater operating at 70 degrees F. will radiate heat from its exposed surfaces to the outside air at about one third the rate of a heater having the same surface area operating at 250 degrees F., with an ambient temperature of 0 degrees F. The positioning of such a device is not limited by thermodynamic considerations, and it may be installed in any convenient and protected location within the engine compartment. Ideally, the heater should as well be relatively small, in order to minimize heat losses from the surface of the device and to permit numerous placement options for installing the device. As well, it is desirable to provide the heater with a thermally-operated switch that turns the heater on only when engine temperature falls below a certain level or if engine coolant level within the heater is low.

OBJECTS OF THE INVENTION

The objects of the present invention are to provide an engine heater for a liquid-cooled internal combustion engine, wherein the engine coolant fluid may be actively circulated through the heater and the engine. A further object is to provide a heater that may be made sufficiently small to provide an array of options for positioning the device within an engine compartment. A further object is to provide a heater that is relatively efficient in its operation and relatively easy to install.

SUMMARY OF THE INVENTION

The present invention comprises an engine heater for installation in a liquid-cooled internal combustion engine. The heater is housed within a housing having fittings for the attachment of entrance and exit hoses, and enclosing an electrical resistance heater element and a pump driven by an electric motor to circulate heated fluid through the housing and the engine. The housing encloses both the pump and the motor, with the motor being in turn housed within a sealed motor casing. An electrical connection supplies current to the motor and extends from the motor through the motor casing and outside the housing. A thermostatically-controlled switch in thermal contact with the housing may be provided, to shut the device off when the temperature of the device exceeds a predetermined level, caused either by heating of the engine or heating of the device itself if the engine coolant level is too low for proper operation of the device. An electrical circuit links the heater, pump and thermostat, with current for the device being provided by an external power source, such as a household outlet. The thermostat may be positioned externally to the device. In a preferred embodiment, the heater core comprises dual resistors housed within a helical sheath that surrounds a direct-current ("DC") pump motor housed within a watertight pump casing. The motor drives an impeller positioned externally to the motor casing. An array of anti-swirl vanes are positioned within the housing extending outwardly from the motor casing adjacent to and downstream of the impeller to guide the flow of fluid and prevent it from rotating with the impeller.

DETAILED DESCRIPTION OF THE PREFERRED EMBODIMENT

The heater of the present invention is intended to be installed within the engine compartment of an automobile or other vehicle. The engine, not illustrated herein, may be any conventional liquid-cooled internal combustion engine, either gasoline or diesel with the appropriate modifications, the device may as well be installed within the engine of a recreational vehicle such as motor home, or in a stationary engine.

Figure 1:
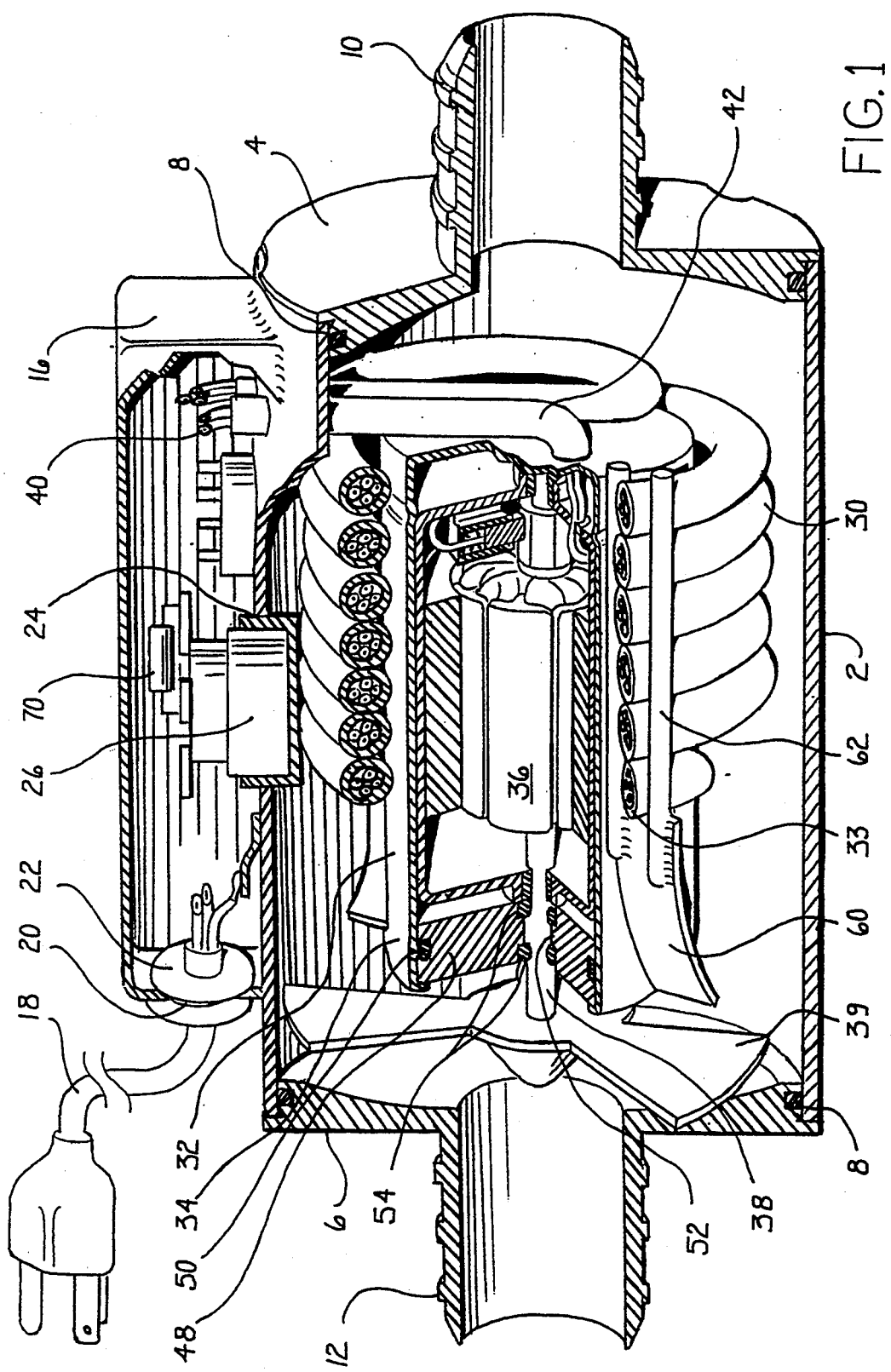
FIG. 1 is a perspective view, partly cut away, of the present invention.
Figure 2:
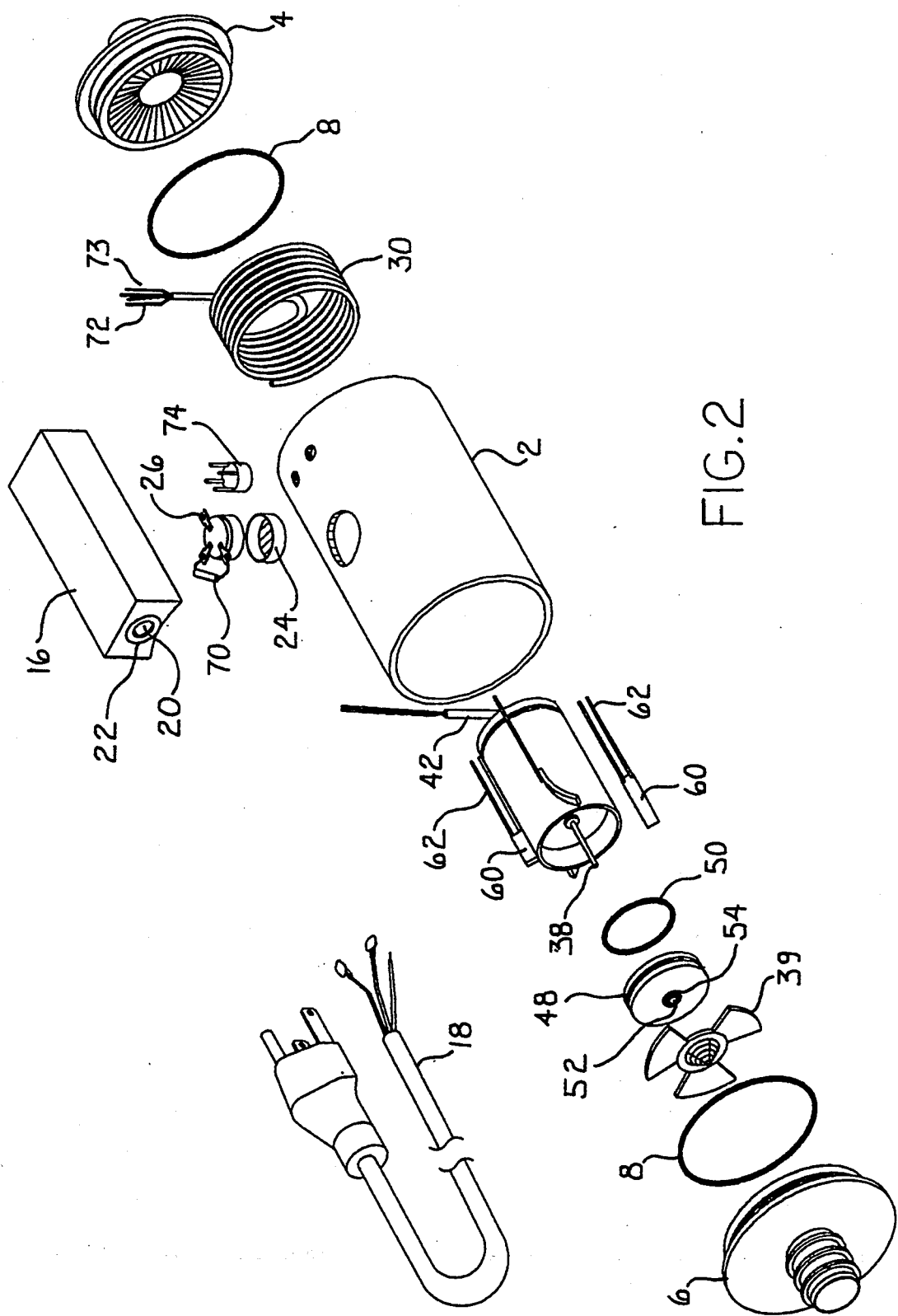
FIG. 2 is a perspective exploded view.

Referring to FIGS. 1 and 2, the heating coil and motor assemblies of the device are housed within a generally cylindrical housing 2. The ends of the housing are sealed by first and second end caps 4 and 6, respectively, each of which is sealingly engaged to the housing by way of an o-ring seal 8. Exit and entry nozzles 10 and 12, respectively, extend from the first and second end caps, and provide a means by which hose, not shown, from the engine and the passenger compartment heater may be attached to the device.

Figures 3, 4:
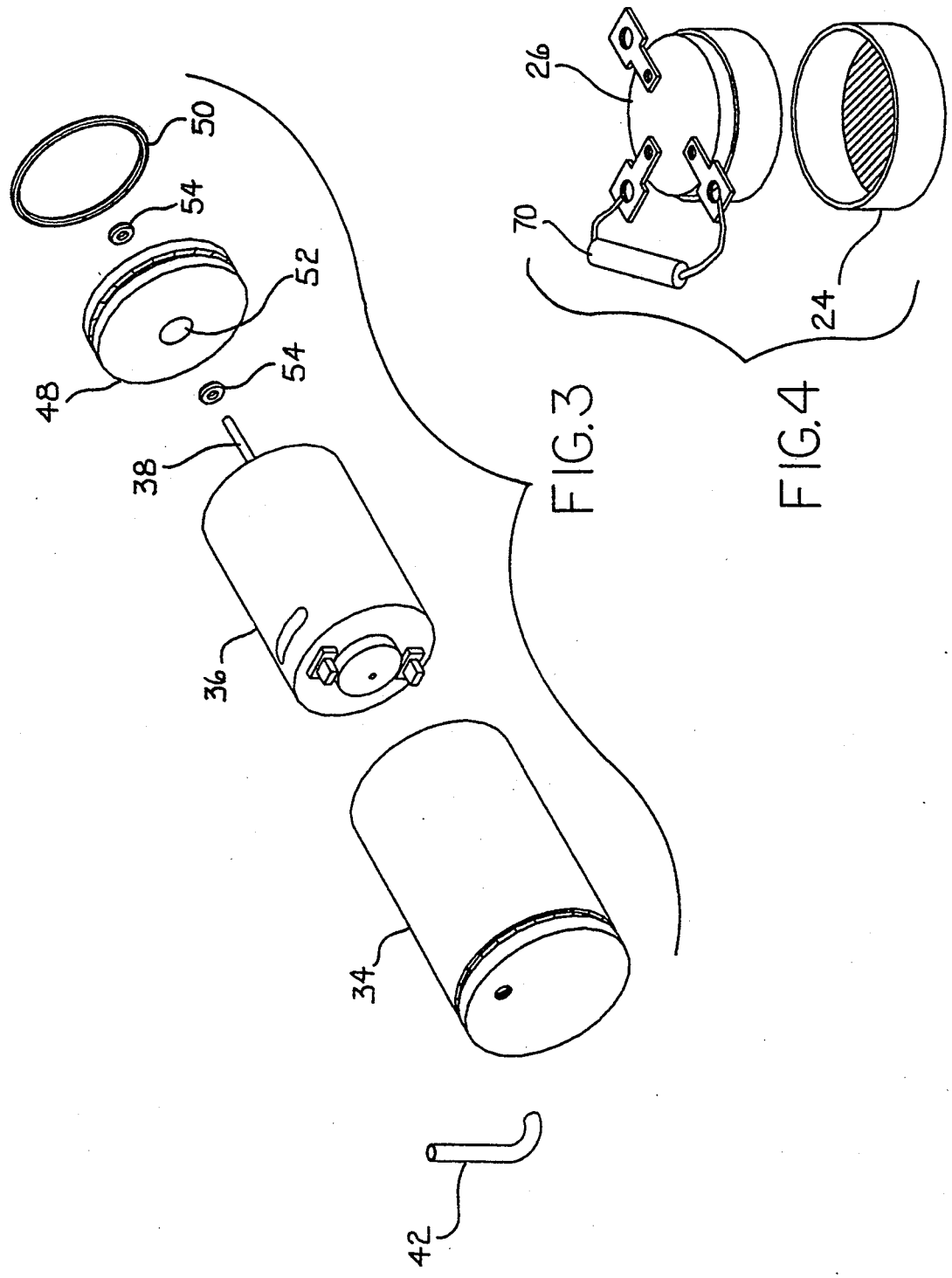
FIG. 3 is a perspective exploded view of a portion of the motor casing and associated elements of the device.
FIG. 4 is a perspective exploded view of the thermostat and associated elements of the device.

A metal cover 16 is attached to an upper face of the housing, and houses the electrical connections and thermostatic switch, described below. An electrical cord 18 enters the cover through an aperture 20 within the cover, sealed by way of a grommet 22. The cord 18 extends out the front of the vehicle hood, and is connected by way of an extension cord to a source of household 120 volt AC current. A thermostat well 24 is recessed into the housing within the cover 16, and houses a thermostat 26, as seen more particularly in FIG. 4. The thermostat comprises a bimetallic element that detects the surface temperature of the housing, and turns the heating element and the pump off if the temperature exceeds a predetermined level, normally set to 70 degrees F. Since the surface temperature of the housing generally reflects the temperature of the engine coolant flowing through the housing, the thermostat is effectively controlled by the engine coolant temperature. The thermostat may as well be configured to turn the device on when the temperature falls below a preset level, typically 30 degrees F. The thermostat prevents operation of the device when the engine is warm, or if the fluid level is too low for the proper operation of the device.

Within the interior of the housing 2, a helical heating element 30 wraps around a pump assembly 32. The heating element comprises a helical metal sheath 33 housing a pair of electrical resistors, described below. The resistors are each wrapped in an insulating layer of fiberglass impregnated with silicone varnish. The output of the heating element is preferably about 630 watts, although the output may readily be reduced by half or doubled, depending on the heating requirements. The pump assembly 32, seen more particularly in FIG. 3, comprises a motor casing 34, an electrical motor 36 housed within the motor casing, an impeller shaft 38 leading from the motor and an impeller 39 (seen in FIGS. 1 and 2) engaged to the end of the shaft. The impeller comprises three canted blades radiating outwardly from the end of the shaft 38. The motor 36 is a conventional DC motor, and will not be further described. An electrical lead 40 enters the motor casing to feed electrical current to the motor. The lead 40 is housed within a conduit 42 within the housing 2, before it enters the motor casing. The motor casing 34 is provided with a closure 48 at one end, sealingly engaged to the casing by way of an O-ring seal 50. The closure 48 is provided with an aperture 52 through which the impeller shaft extends, with dual shaft seals 54 surrounding the shaft at the aperture to prevent the entry of fluid into the motor casing and to retain lubricant within the casing 34.

The positioning of the motor within the housing 2 results in virtually all of the heat generated by the motor being transmitted to the engine fluid.

The impeller 39 is driven by the motor 36 to rotate at about 4,000–5,000 RPM. At this speed, the impeller drives approximately 2 to 5 liters per minute of engine fluid through the device, depending on the resistance the fluid encounters within the engine and the size of the hoses. The device may be installed so as to pump fluid in either direction, such that the fluid flows either in the normal or reverse directions of fluid flow through the engine.

Four anti-swirl vanes 60, seen in FIGS. 1 and 2, extend outwardly from the exterior of the motor casing 34, downstream from the impeller 39, the longitudinal axes of the vanes being generally parallel to the longitudinal axis of the impeller shaft 39. Each vane comprises an elongate curved web spanning the interior of the housing between the exterior of the motor casing and the interior wall of the housing 2. A pair of support rods 62 extends rearwardly from each vane. A first of the support rods is attached along its length to the motor casing and a second of the support rods engages the heating coil and the interior of the housing 2. The vanes serve to direct the flow of fluid within the housing, and in particular to prevent swirling of the fluid as it flows through the housing. As well, the vanes position the pump assembly and heater within the housing 2. The vanes may be either curved or straight, and may alternatively comprise a rib extending into the interior of the housing from either the wall of the housing or the exterior of the motor housing.

While the preferred embodiment is provided with three impeller blades and four anti-swirl vanes, other combinations are possible. It is preferable to provide an odd number of impeller blades and an even number of anti-swirl vanes, or the reverse, as is standard with axial-flow pumps.

Figure 5:
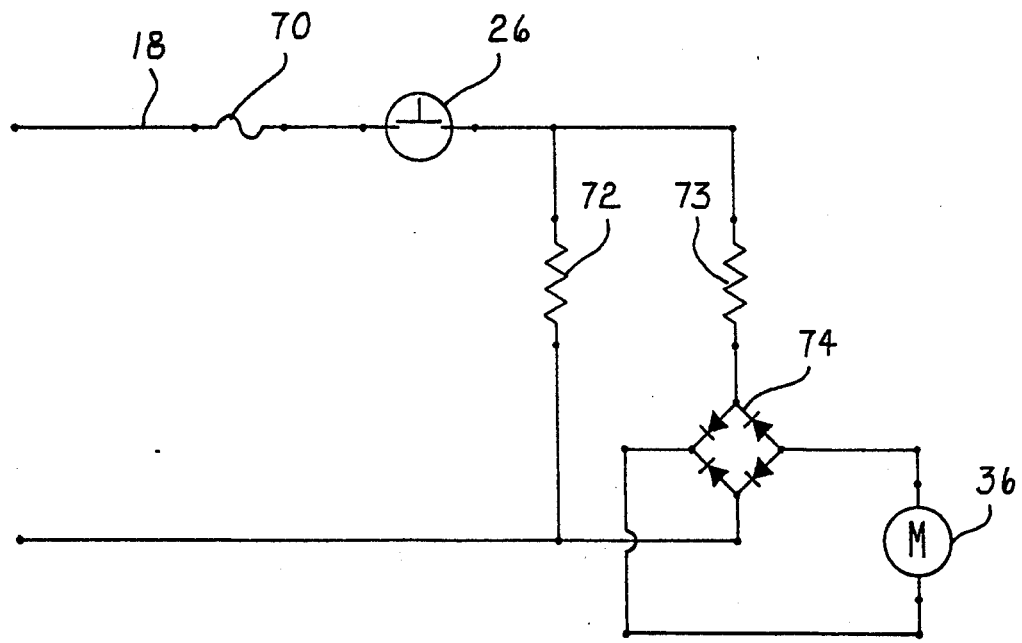
FIG. 5 is a schematic view of the electrical circuit of the device.
Figure 6:
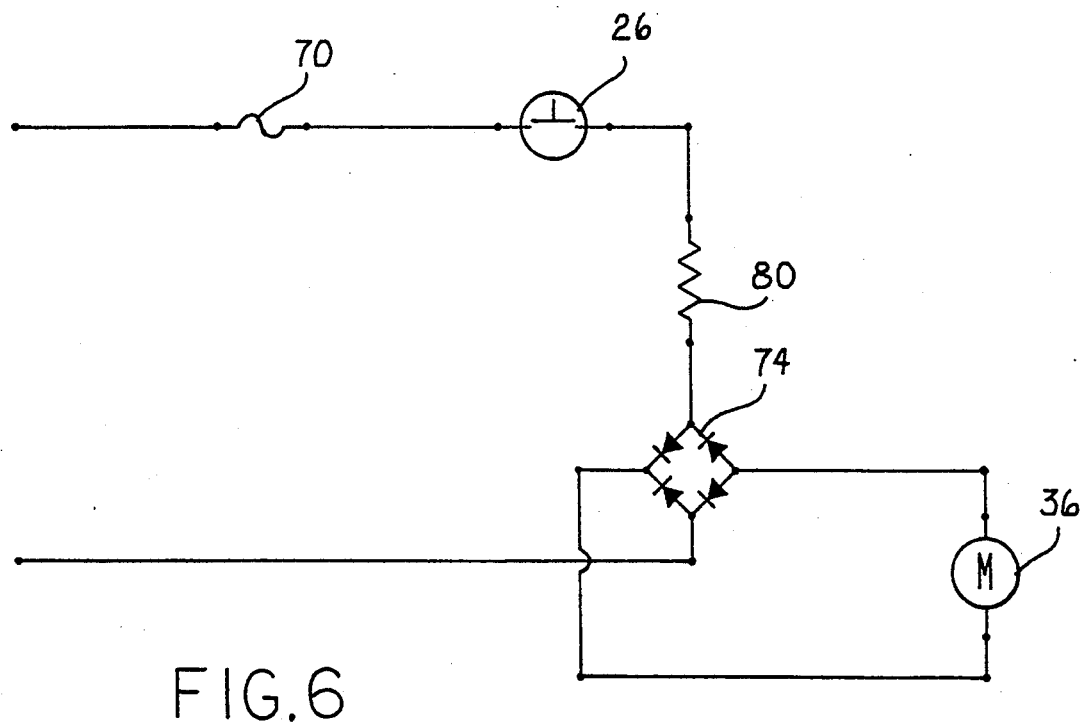
FIG. 6 is a schematic view of the electrical circuit of a second embodiment of the device.

Turning to FIG. 5, the electrical circuit of the device is illustrated. The cord 18 is linked to a source of household current by an extension cord, not shown, and connects to a fuse 70. Current flowing through the device passes through the thermostatic switch 26. Current for the main heating element passes through resistor 72, with a resistance of 30 ohms. Current to the motor passes through a current-limiting resistor 73 having a resistance of 90 ohms, and is rectified by a full-wave rectifier 74 that supplies pulsating DC current to the motor 36 at a maximum rate of one amp. Both of the resistors 72 and 73 provide heat to the heating element, and both are positioned within the helical sheath 33. In an alternative embodiment, shown at FIG. 6, a single resistor 80 is provided in place of the dual resistors of the first embodiment, with the resistor 80 comprising both the heating element and the current-limiting resistor for the motor power supply. It will be recognized that although the resistors 73 and 80 are described as the heating elements, all elements within the circuit will generate heat, much of which is ultimately transmitted to the engine coolant.

The thermostatic switch is adapted to turn the device on when the engine coolant temperature falls below a predetermined level, normally 40 degrees F. (5 degrees C.), and to turn it off when it exceeds a predetermined level, normally 70 degrees F. (20 degrees C.).

In operation, the device is linked to the coolant system of an engine, by way of hoses engaged to the entry and exit nozzles 10 and 12. In practice, the device may be installed by cutting one of the coolant hoses of the engine, for example the supply or return hose of the passenger compartment space heater, and connecting the device into the cut hose. The device may be oriented to pump fluid in either the forward or reverse directions of normal fluid flow. Since the device has no internal valves, there is minimal impedance of the flow of engine coolant when the engine is running. Since the pump draws a relatively large flow of fluid through the device, in comparison with prior art in-line heaters, the heating element will warm the fluid relatively slightly with each cycle. As a result, the engine is heated evenly and rapidly.

Although the present invention has been described by way of preferred embodiments thereof, it will be apparent to those skilled in the art that numerous variations may be made to the present invention, without departing from the spirit and scope thereof, as defined by the appended claims.

I claim:

1. A heater for a liquid-cooled internal combustion engine, said heater comprising a housing, an electrical resistance heater element within said housing, entry and exit passages for the admission and discharge of engine coolant fluid through the housing, and a pump driven by an electric motor to circulate said fluid through the housing in a direction of flow from the entry passage to the exit passage, said electric motor being housed within a motor case and said pump and motor case being enclosed within said housing, said fluid being brought into contact with said heater element within said housing, with said fluid being circulated through said engine by said pump after being heated by said heating element, wherein there is further provided at least one anti-swirl vane within said housing adapted to lessen turbulence of and to guide said fluid as it passes through said housing, said at least one vane comprising a web oriented generally parallel to the direction of flow of fluid through said housing.

2. A heater as claimed in claim 1, wherein said heater is further provided with a thermostatic control adapted to turn said heater element and said pump off when the temperature of the engine coolant exceeds a predetermined level and to turn it on when the coolant temperature falls below a predetermined level.

3. A heater as claimed in claim 2 wherein said thermostatic control is adapted to turn said heater on when the coolant temperature drops below about 40 degrees Fahrenheit and to turn said heater off when the coolant temperature exceeds about 70 degrees Fahrenheit.

4. A heater as claimed in claim 1, wherein said heating element comprises an electrical resistor housed within a helical sheath wrapped at least partly around said motor case.

5. A heater as claimed in claim 1, wherein there is provided an array of said anti-swirl vanes generally evenly distributed about and extending outwardly from said motor case, each of said vanes spanning said housing between said motor case and an interior wall of said housing, said vanes acting as positioning mounts to mount said motor case within said housing while providing passage for said fluid between said motor case and an interior wall of said housing.

6. A heater as claimed in claim 1, wherein said pump is adapted to circulate 2–5 liters of said fluid per minute through said housing.

7. A heater as claimed in claim 1, wherein said electrical resistance heater element comprises first and second electrical resistors, one of said resistors comprising a current-limiting resistor for the supply of current to said electric motor, both of said resistors being housed within a sheath positioned within said housing.

8. A method for heating a liquid-cooled internal combustion engine prior to starting said engine, said method comprising the step of circulating engine coolant fluid through said engine, said fluid being heated by means of an engine heater, said engine heater comprising a housing, an electrical resistance heating element within said housing, entry and exit passages for the admission and discharge of engine coolant fluid through the housing, and a pump driven by an electric motor to circulate said fluid through the housing in a direction of flow from the entry passage to the exit passage, said electric motor being housed within a motor case and said pump and motor case being enclose within said housing, said fluid being brought into contact with said heater element within said housing, with said fluid being circulated through said engine by said pump upon being heated by said heating element, wherein there is further provided at least one anti-swirl vane within said housing adapted to lessen turbulence of and to guide said fluid as it passes through said housing, said at least one vane comprising a web oriented generally parallel to the direction of flow of fluid through said housing.

9. A method as claimed in claim 8, wherein said heater is further provided with a thermostatic control adapted to turn said heating element and said pump off when the coolant temperature exceeds a predetermined level and to turn said heating element and said pump on when the coolant temperature falls below a predetermined level.

10. A method as claimed in claim 9 wherein said thermostatic control is adapted to turn said heater on when the coolant temperature drops below about 40 degrees Fahrenheit and to turn said heater off when the coolant temperature exceeds about 70 degrees Fahrenheit.

* * * * *